United States Patent
Pawliczek et al.

(10) Patent No.: US 11,806,933 B2
(45) Date of Patent: Nov. 7, 2023

(54) METHOD OF PROVIDING A PARTICULATE MATERIAL

(71) Applicant: EOS GmbH Electro Optical Systems, Krailling (DE)

(72) Inventors: Sven Pawliczek, Gilching (DE); Ulrich Kleinhans, Prittriching (DE); Marius Christ, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 178 days.

(21) Appl. No.: 17/309,545

(22) PCT Filed: Dec. 4, 2019

(86) PCT No.: PCT/EP2019/083718
§ 371 (c)(1),
(2) Date: Jun. 4, 2021

(87) PCT Pub. No.: WO2020/115156
PCT Pub. Date: Jun. 11, 2020

(65) Prior Publication Data
US 2022/0024828 A1    Jan. 27, 2022

(30) Foreign Application Priority Data
Dec. 5, 2018 (DE) ............ 10 2018 130 962.7

(51) Int. Cl.
*B29C 64/314* (2017.01)
*B33Y 70/00* (2020.01)
(Continued)

(52) U.S. Cl.
CPC .......... *B29C 64/314* (2017.08); *B01J 23/868* (2013.01); *B01J 23/883* (2013.01);
(Continued)

(58) Field of Classification Search
None
See application file for complete search history.

(56) References Cited

U.S. PATENT DOCUMENTS

2013/0287590 A1    10/2013 Neuhaeusler et al.
2016/0016336 A1    1/2016 Hess et al.
(Continued)

FOREIGN PATENT DOCUMENTS

CN    102615289 A    8/2012
CN    105764634 A    7/2016
(Continued)

OTHER PUBLICATIONS

"German Application No. 10 2018 130 962.7, Search Report dated Aug. 23, 2019", (w/ Concise Statement of Relevance), 10 pgs.
(Continued)

*Primary Examiner* — Colin W. Slifka
(74) *Attorney, Agent, or Firm* — Schwegman Lundberg & Woessner, P.A.

(57) ABSTRACT

A method of providing a particulate material from an at least substantially metallic and/or ceramic starting material, comprising the following steps:
(a) generating the particulate material from the starting material by vaporizing the starting material by introducing energy, preferably radiation energy, in particular by means of at least one laser, into the starting material and subsequently at least partially condensing the vaporized starting material,
b) collecting the particulate material in at least one receiving and/or transporting device, in particular at least one container,
c) receiving, in particular storing, and/or transporting the particulate material in the receiving and/or transporting device and/or in a further receiving and/or transporting
(Continued)

Figure 1:
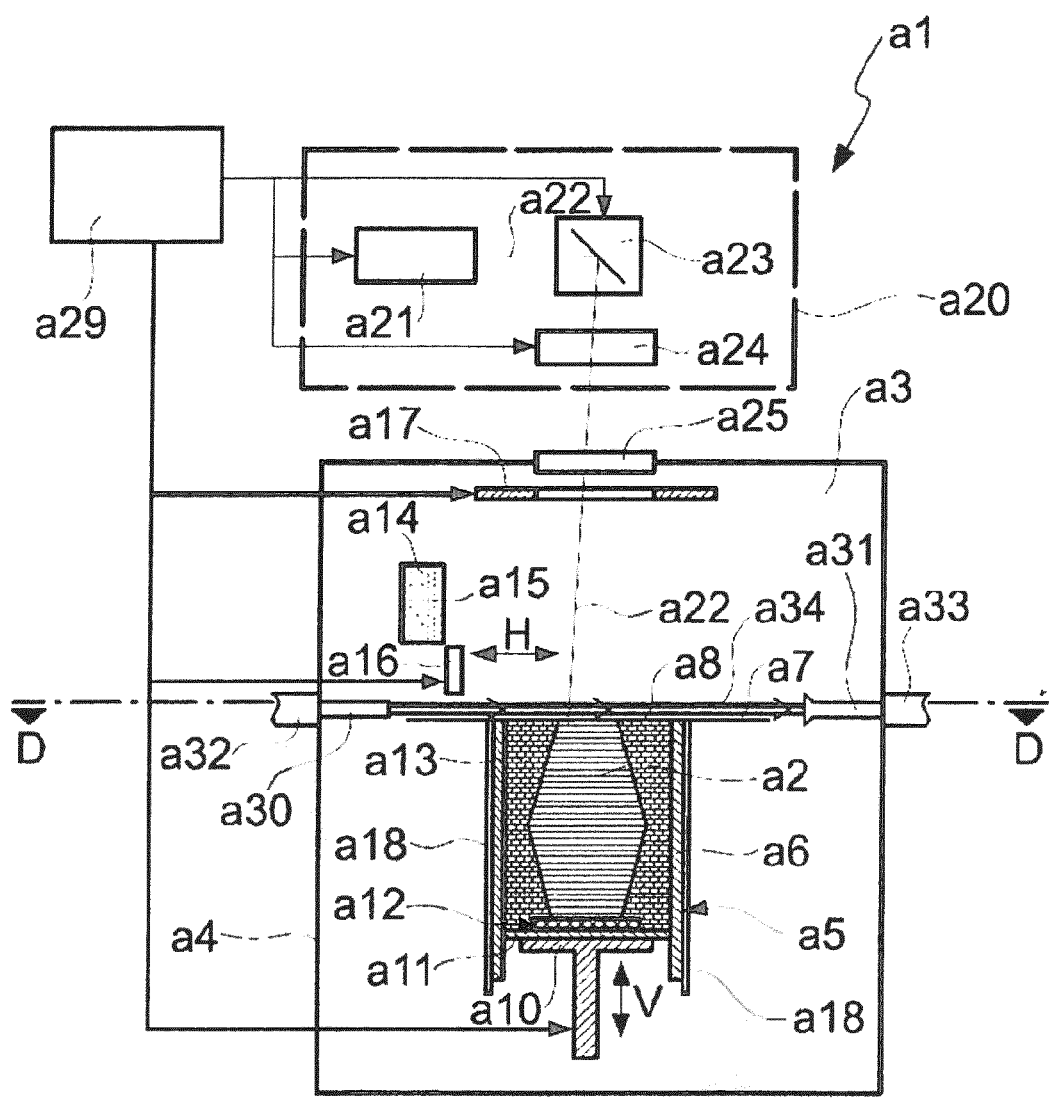

device such that it can be used for a subsequent process, in particular in a state of at least non-permanent passivation, and d) providing the particulate material for the subsequent process.

7 Claims, 5 Drawing Sheets

(51) Int. Cl.
| | |
|---|---|
| B01J 23/86 | (2006.01) |
| B01J 23/883 | (2006.01) |
| B01J 35/00 | (2006.01) |
| B01J 35/10 | (2006.01) |
| B01J 37/00 | (2006.01) |
| B01J 37/34 | (2006.01) |
| C04B 41/00 | (2006.01) |
| B33Y 10/00 | (2015.01) |
| B22F 10/28 | (2021.01) |
| B28B 1/00 | (2006.01) |
| B22F 12/70 | (2021.01) |

(52) U.S. Cl.
CPC ....... *B01J 35/0013* (2013.01); *B01J 35/1009* (2013.01); *B01J 37/0072* (2013.01); *B01J 37/349* (2013.01); *B33Y 10/00* (2014.12); *B33Y 70/00* (2014.12); *C04B 41/0036* (2013.01); *B22F 10/28* (2021.01); *B22F 12/70* (2021.01); *B28B 1/001* (2013.01)

(56) References Cited

U.S. PATENT DOCUMENTS

| 2017/0096967 A1 | 4/2017 | Bostwick et al. |
| 2017/0246709 A1 | 8/2017 | Guerrier et al. |
| 2017/0361377 A1 | 12/2017 | Guerrier et al. |

FOREIGN PATENT DOCUMENTS

| CN | 106715034 A | 5/2017 |
| CN | 107000120 A | 8/2017 |
| DE | 10297575 T5 | 1/2005 |
| DE | 102011008809 A1 | 7/2012 |
| WO | WO-03/053614 A1 | 7/2003 |
| WO | WO-2020115156 A1 | 6/2020 |

OTHER PUBLICATIONS

"International Application No. PCT/EP2019/083718, Written Opinion dated Mar. 27, 2020", (w/ English Translation), 20 pgs.
"Chinese Application No. 201980088691.6, First Office Action dated Aug. 29, 2022", (Aug. 29, 2022), 21 pgs.
"German Application No. 10 2018 130 962.7, Search Report dated Aug. 23, 2019", (Aug. 23, 2019), 9 pgs.
"International Application No. PCT/EP2019/083718, International Search Report and Written Opinion dated Mar. 27, 2020", (Mar. 27, 2020), 18 pgs.
Martin, John, et al., "3D printing of high-strength aluminium alloys", Nature. 549. 365-369. 10.1038/nature23894 [abstract only], (Sep. 2017), 365-369.
Park, K., et al., "Characterizing the coating and size-resolved oxidative stability of carbon-coated aluminum nanoparticles by single-particle mass-spectrometry", Journal of Nanoparticle Research (2006) 8: 455-464, (2006), 455-464.
Schatt, Werner, et al., "Pulvermetallurgie: Technologien und Werkstoffe", Edition: 2. AuflagePublisher: SpringerEditor: Werner Schatt, Klaus-Peter Wieters und Bernd KiebackISBN: 3-540-23652-X; 978-3-540-23652-8 [with English abstract], (Jan. 2007), 547.

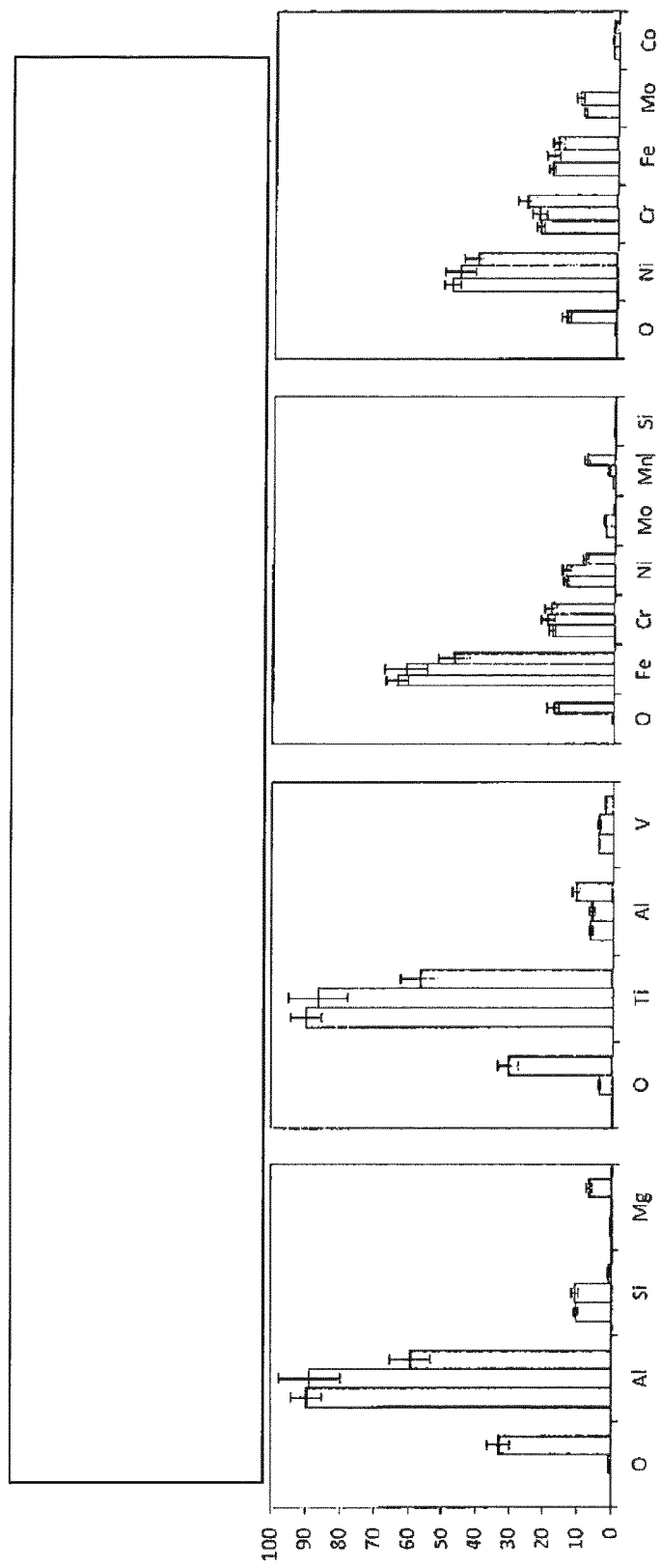

METHOD OF PROVIDING A PARTICULATE MATERIAL

PRIORITY CLAIM TO RELATED APPLICATIONS

This application is a U.S. national stage filing under 35 U.S.C. § 371 from International Application No. PCT/EP2019/083718, filed on 4 Dec. 2019, and published as WO2020/115156 on 11 Jun. 2020, which claims the benefit under 35 U.S.C. 119 to German Application No. 10 2018 130 962.7, filed on 5 Dec. 2018, the benefit of priority of each of which is claimed herein, and which applications and publication are hereby incorporated herein by reference in their entirety.

DESCRIPTION

The invention relates to a particulate material and a composition, as well as a method and a system for providing a particulate material or a composition, and corresponding uses.

In various applications, for example for additive manufacturing processes (e.g. 3D printing), for or as catalysts and/or for (super) capacitors (as electrodes), particulate material (in particular nanoparticulate material) is used or described as beneficial. For example, in the publication "3D Printing of high-strength aluminium alloys", John H. Martin, Brinnan D. Yahata, Jacob M. Hundley, Justin A. Mayer, Tobias A. Schaedler, and Tresa M. Pollock, Nature 549 (7672), 365-369, 2017, the advantage of nanoparticles in 3D printing of aluminium alloys is described. Prior art manufacturing processes for such particulate material (nanoparticulate material) are found to be comparatively extensive. In addition, the quantity that can be produced per unit of time is sometimes comparatively small.

It is therefore an object of the invention to propose a method as well as a system for providing a particulate material, with which a large quantity of the particulate material can be produced in a comparatively simple manner. Furthermore, it is an object of the invention to propose a corresponding particulate material, a corresponding method for producing a composition, a corresponding composition as well as corresponding uses.

This object is solved in particular by the features of claim 1.

Preferably, the object is solved by a method for providing a particulate material from an at least substantially metallic and/or ceramic starting material, comprising the following steps:
a) Producing the particulate material from the starting material by vaporizing the starting material by introducing energy, preferably radiation energy, in particular by means of at least one laser, into the starting material and subsequently condensing (at least partially, optionally at least substantially completely) the vaporized starting material,
b) collecting the particulate material in at least one (optionally first) receiving and/or transporting device, in particular at least one container,
c) receiving, in particular storing, and/or transporting the particulate material in the first (and/or optionally a further, second) receiving and/or transporting device such that it can be used for a subsequent process, in particular in a state of at least non-permanent passivation, and
d) providing the particulate material for a subsequent process.

A core idea of the invention lies in producing the particulate material by vaporizing the starting material and subsequent condensation, wherein the particulate material is configured or provided for a subsequent process. In this way, a high quantity of particulate material, in particular of comparatively high quality, optionally with comparatively small and/or homogeneous particle sizes, can be produced in a simple manner.

The particulate material is preferably nanoparticulate material (preferably as specified further below). Also, the starting material is preferably present in particulate form (but may also be partially or completely non-particulate). If a particulate embodiment is present, a particle size of the starting material is preferably (significantly) larger than a particle size of the particulate material, for example at least 2 times, further preferably at least 5 times, still further preferably at least 10 times, optionally at least 100 times or at least 500 times or at least 1000 times, as large (preferably according to the specific definitions for particle size following still below). Alternatively, or additionally, the starting material may be in block form, in particular plate form (e.g., as a metal plate). The starting material may form or comprise a coherent, in particular monolithic, body which preferably has a weight of at least 1 g, preferably at least 10 g, optionally at least 100 g or at least 1 kg, and/or which has an outer surface area of at least 25 $cm^2$, preferably at least 400 $cm^2$, optionally at least 1000 $cm^2$.

Nanoparticles in particular can have a positive effect on the process, for example in a build-up powder for additive manufacturing processes. It can be assumed that increased absorption of the laser light takes place due to multi-reflection and -scattering. On the one hand, light can possibly be scattered by small aerosols or nanoparticles (sitting on the build-up powder), but possibly also absorbed there. The nanoparticles can have a better (or for the process more favourable) absorption coefficient than the actual powder. Furthermore, the scattered light can, possibly, be directed again to surrounding powder, where again a part can be absorbed there. This can make it possible to additively build alloys or materials that would otherwise be difficult or impossible to additively build. A fine-grained microstructure can be formed. Furthermore, nanoparticles on the (build-up) powder surface can reduce the risk of powder blowing. Particle mobility may be limited by geometric interlocking and forces (especially van der Waals forces) between agglomerates contacting each other. Overall, component properties can be specifically influenced. Oxides and/or nitrides, in particular oxidic and/or nitridic nanoparticles, can, for example, embrittle the structure and/or introduce alloying elements in a targeted manner, which in turn change the properties and microstructure.

The (nano)particles of the particulate material can be amorphous, crystalline or partially crystalline.

Radiation energy means in particular energy provided by electromagnetic waves, preferably (visible) light and/or infrared light and/or UV light. Particularly preferably, the radiation energy is provided by means of at least one laser, optionally VCSEL (surface emitter), which is further preferably moved or grid-like-moved (over a surface). It is her preferred that the point of impact of the laser on the starting material is moved (i.e., the laser beam itself is moved or pivoted or deflected). Alternatively, or additionally, a platform (e.g. building platform) for the starting material can also be moved (in one or more directions) (via a drive device provided for this purpose). In that case, the laser may be oriented in a stationary manner.

Condensation means, in particular, a (permanent) assembly of individual molecules of the vaporized starting material (in particular in a carrier gas, such as air and/or an inert gas or an inert gas mixture; as inert gases e.g. $N_2$ and/or Ar and/or He are possible; as an inert gas mixture, at least one inert gas and a reactive gas, such as $O_2$ or air, can also be used, for example) is to be understood as initially into a liquid state and/or directly into a solid state (or via a liquid intermediate state into a final solid state). The transition (from the gaseous to the liquid/solid state) can in particular take place by (homogeneous) condensation (nucleation) in the gas phase or not on existing surfaces (e.g. of aerosols), the latter being alternatively the case.

In step a), energy is preferably introduced or material is vaporized over a comparatively large surface area of the starting material (preferably by moving the impact area of an energy-introducing device, in particular a laser, and/or by a correspondingly large area of the impact area of an energy-introducing device with respect to the starting material) of at least 1 $cm^2$, further preferably at least 10 $cm^2$, still further preferably at least 100 $cm^2$, and/or at most 50,000 $cm^2$, preferably at most 10,000 $cm^2$, optionally at most 1,000 $cm^2$.

In step a), preferably not all of the provided starting material is vaporized, but only a portion thereof (for example, in a surface area of the provided starting material). For example, only 50%, preferably only 20%, still further preferably only 5% of the provided starting material may be vaporized accordingly. The remainder can remain and be used elsewhere (for example, in the context of an additive process for producing a corresponding object). Insofar as here and in the following proportions of a substance (material or fluid, in particular of a liquid or a gas) are indicated as a percentage, this is to be understood to mean in particular "% by weight" (insofar as nothing else results from the respective context, such as, for example, atomic %).

The (respective) receiving device is in particular a (preferably substantially fluid-tight) sealable or sealed receiving device (optionally with a corresponding closure device). It is also possible for a (in particular the first) receiving device to be designed without a closure device and for another (in particular the second) receiving device to be designed with a closure device. The (respective) receiving device, in particular the container, may have a receiving volume of at least 5 $cm^3$, further preferably at least 100 $cm^3$, optionally at least 1,000 $cm^3$ and/or at most 1,000,000 $cm^3$, preferably at most 100,000 cm3, optionally at most 10,000 $cm^3$. The (respective) receiving device is preferably filled to at least 20%, further preferably at least 50%, optionally at least 90% with particulate material. The or at least one (in particular the first) receiving device may be a collecting container. The respective receiving device (the respective container) is preferably dimensionally stable.

A (respective) transport device can also be understood to be a container, but also, for example, a conduit or other transfer device in which the particulate material, for example in a carrier fluid, can be supplied to the subsequent process.

The particulate material is preferably received, in particular stored, or transported in the (respective) receiving or transporting device such that it can be used for a subsequent process. Thereby, a corresponding (non-permanent) passivation or inertization can be present or carried out. However, any passivation or inertization can also be omitted or prevented (by appropriate measures, such as a low temperature, in particular below 20° C., possibly below 10° C., and/or by evacuation).

In general, there should preferably be a state of the particulate material in the (respective) receiving or transporting device in which the particulate material is not permanently modified in such a way that it is no longer usable for a subsequent process or in which the particulate material is not permanently inertizised. Permanent inertization means in particular irreversible, non-temporal inertization. Reversible inertizations or passivations, such as embedding the particulate material in a matrix that can be (completely) removed again, are, however, preferably optionally possible. Inertization can be achieved, for example, by oxidation, in particular with oxygen or water. Oxidation can generally be understood as a process in which electrons are given up by one element (e.g. metal) and taken up by another element.

If inertization or passivation occurs, this passivation is preferably reversed before, during or after step d).

Overall, the particulate material should not lose its ability to be used in the subsequent process (reactivity). However, this ability (reactivity) may be reduced, if necessary, for removal and/or storage and/or transport, possibly until complete passivation, provided that this is reversible. For example, storage in a container filled with an inert gas may be carried out until the particulate material is further used.

Not desirable, in particular, are treatments that lead to permanent reaction passivation, such as (depending on the material) thermal treatment at a temperature of at least room temperature (23° C.) or at least 40° C. or at least 100° C. If necessary, the temperature of the stored (or provided or transported) particulate material may be kept below a maximum temperature, for example, of less than or equal to 30° C., preferably less than or equal to 23° C., further preferably less than or equal to 18° C., optionally less than or equal to 10° C. or less than or equal to 0° C. (so that the condensed-out particulate material is kept reactive). Especially for easily flammable materials, cooled removal and/or storage is preferred. Furthermore, a contact with a gas (reactive with respect to the particulate material) or a corresponding gas mixture should preferably be avoided (in particular with a gas containing more than 10% by weight, preferably more than 1% by weight oxygen). Also, contact with a liquid (reactive with respect to the particulate material) (e.g. water) should preferably be avoided.

Also, a (permanent or irreversible) combination with (embedding in) a solid material should preferably not take place in step c) (for example, a combination with a solid material for reduction of the particulate material or a passivation of the particulate material, for example by sand). Often, for example, condensates produced in 3D printing processes are passivated in this way, for example by adhesion of the condensate to water glass. Such passivation is then permanent, so that the particulate material can no longer be used. Often, corresponding particulate material is also covered with sand (for safety reasons) and sometimes (in particularly critical cases) alternatively or additionally soaked in silicone oil. This leads to the condensate no longer being reactive and therefore, in particular, cannot be made available for a subsequent process.

The starting material can be a pure material, a component of an alloy, an alloy, a dispersion, a starting material with coating and/or a starting material embedded in a matrix material.

The energy input (energy radiation) preferably causes vaporization and subsequent rising of the corresponding vapour (e.g. metal vapour) in a process chamber atmosphere, in particular with subsequent (comparatively fast) condensation of the vapour to a condensate or particulate material.

For condensation, cooling of the vaporized material can take place, for example (if necessary automatically) in a process chamber atmosphere.

A (process chamber) atmosphere preferably differs in its (chemical) composition from the ambient air. The (chemical) composition is preferably set or adjustable (by means of an optionally provided adjustment device). In a corresponding (process chamber) atmosphere, for example, inert gases and/or reactive gases may be contained. Preferred inert gases are argon, nitrogen and/or helium. As a reactive gas or reactive gas additive to an inert gas, for example, ethylene is conceivable (and possibly, in the present context, no oxidizer, in particular no oxygen). In particular, ethylene as an additive to the process gas can ensure that a thin carbon layer is formed on the surface of the individual particles of the particulate material (see Park et al. 2006 "Characterizing the coating and size-resolved oxidative stability of carbon-coated aluminum nanoparticles by single-particle mass-spectrometry." Journal of Nanoparticle Research 8.3-4 (2006): 455-464). A proportion of inert gas in the (process chamber) atmosphere may be, for example, at least 10%, preferably at least 30%, still further preferably at least 80%, still further preferably at least 90%. A proportion of reactive gas may be, for example, at least 0.1%, preferably at least 2%, still further preferably at least 5%, still further preferably at least 20%. By reactive gas is preferably meant a gas containing carbon or molecules with a carbon component. In this sense, $CO_2$ and/or CO shall preferably be a reactive gas (however, if necessary, the reactive gas may also comprise no $CO_2$ and/or CO). The reactive gas may also comprise $O_2$ and/or (e.g., for Ti) $N_2$ (or at least comprise substantially no $O_2$ and/or no $N_2$).

In general, the properties of the particulate material can be influenced by: the nature (composition) of a process gas, the pressure of the process gas, and/or a velocity of the process gas (or transport of the vaporized starting material or the condensate), and/or a cooling (especially cooling rate) of the vaporized build-up material (up to the condensate). Preferably, one or more of the parameters just mentioned are set accordingly, in particular controlled, preferably regulated. Preferably, a corresponding control device can be employed for this purpose.

A temperature of the process gas at an inlet to the process chamber is preferably at least 0° C., further preferably at least 20° C. and/or at most 200° C., preferably at most 100° C.

A pressure of the process gas in the process chamber is preferably at least 0.001 atm, further preferably at least 0.01 atm and/or at most 10 atm, preferably at most 5 atm.

A flow velocity of the process gas in at least one region of the process chamber, preferably in at least one direction, in particular in at least one direction perpendicular to the height direction or the laser is preferably at least 0.2 m/s, further preferably at least 2 m/s and/or at most 10 m/s, preferably at most 5 m/s.

By a substantially metallic starting material is preferably meant a starting material that is at least 50% by weight, preferably at least 80% by weight, still further preferably at least 90% by weight metallic (or comprises corresponding metallic components). Accordingly, by a substantially ceramic starting material is meant a starting material comprising at least 50% by weight, preferably at least 80% by weight, still further preferably at least 90% by weight, of a ceramic material. Accordingly, a substantially metallic and ceramic starting material is to be understood as a starting material comprising at least 50% by weight, preferably at least 80% by weight, still further preferably at least 90% by weight, of a metallic and ceramic material.

The subsequent process may, for example, be a manufacturing process in which the particulate material is used. For example, using the particulate material, a (dimensionally stable) object with a predetermined geometry or structure can be produced. By provision of the particulate material for a subsequent process is to be understood in particular an admixture of the (possibly after-treatment-free) particulate material to a further material, for example metal material (metal powder and/or metal melt) and/or polymer material (polymer powder and/or polymer melt) and/or ceramic material (ceramic powder, ceramic slurry), as a solid mixture and/or pure material and/or the production of a powder composition, preferably for use in an additive manufacturing process, preferably in an additive manufacturing process operating via melting, further preferably laser sintering or laser melting.

In particular, step d) is to be understood as meaning that the particulate material is configured such that it can be used in the subsequent process, for which purpose optionally a step is first carried out in order to reverse an optional inertization or passivation (but this can also optionally only be carried out during the subsequent process itself). Such a step may, but need not, occur in the method according to the invention. In this respect, the provision of a (non-permanently) inertisized or passivated particulate material is also considered advantageous. Provision may include or be defined by a packaging (e.g., for sale to a third party who may then perform the subsequent process). The contents of the packaging may be formed by at least 10% by weight or at least 50% by weight by the particulate material or a mixture of the particulate material with another, in particular particulate (build-up) material. The contents of the packaging and/or the particulate material in the packaging may weigh at least 10 g, preferably at least 100 g, further preferably at least 1 kg. The subsequent process is in particular not a (pure) disposal.

The process according to the invention ends in principle at step d), but may also comprise subsequent steps, in particular the subsequent process (or the execution thereof) itself.

The energy in step a) is preferably introduced locally and/or in a grid-like manner. By a local introduction is preferably meant an introduction in which there is (at least at one or each individual point in time) a localized impact area of the corresponding energy introduction device (for example, an area of less than or equal to 1 $cm^2$, further preferably less than or equal to 1 $mm^2$, still further preferably less than or equal to 0.1 $mm^2$, still further preferably less than or equal to 0.01 $mm^2$). The localized introduction can then be broadened (over time) by distributed introduction over a larger area (by relatively moving an impact point or impact area of the corresponding energy introduction device). Preferably, the energy is introduced at least by means of at least one (moving with respect to its impact area, in particular grid-like) laser beam (optionally a VCSEL). In a specific embodiment, the energy is introduced within a laser sintering process. In any case, a comparatively large amount of starting material can be vaporized (and subsequently condensed as well as collected) in a simple manner and made available to the subsequent process accordingly.

Preferably, the laser beam (or its impact area) moves relative to a surface of the starting material. Preferably, the starting material remains at rest and the laser or its impact area is moved relative to it (in particular in a grid-like manner). Alternatively, the impact area of the laser beam can also remain at the same location (in absolute terms) and the starting material or its surface can be moved (in particular such that the laser beam or its impact area moves grid-like relative to the starting material over its surface). A combination is also possible, such that both laser beam or its impact area and the starting material itself are moved (in particular such that in relation to each other the impact area moves grid-like over the starting material).

In one embodiment, the energy in step a) can be introduced into a moving starting material, in particular a starting material moving in a carrier gas. Alternatively, or additionally, the starting material can be suspended in a carrier or carrier gas (in step a). Also by that the particulate material can be generated in a simple and effective manner.

During the grid-like movement, there may be a (relative) movement of the location of the energy introduction (in particular impact area of a laser beam) with respect to the starting material, wherein at least one row (or column) is scanned accordingly, optionally at least or exactly once or several times. Preferably, at least two or at least five or at least 10 or at least 100 lines (or columns), which in particular lie above or next to one another, are scanned accordingly.

A (respective) line (or column) is preferably at least 5 times, further preferably at least 10 times, still further preferably at least 100 times as long as a diameter of an energy introduction area (or impact area of the laser beam).

Preferably, the vaporized and/or condensed particulate material is directed to a material separation device in step a) and/or b). By means of the material separation device, the particulate material is preferably separated from a (carrier gas) volume flow at least partially, in particular at least substantially completely, preferably physically. A corresponding separation device may comprise, for example, a filter and/or cyclone.

Generally, the particulate material may already be generated (at least partially, optionally completely) in a process chamber atmosphere. Alternatively, or additionally, the particulate material may be generated (or condensed out) at least partially (optionally completely) outside the process chamber.

A material separation device may be a wall of a process chamber and/or a larger separation device (e.g., filter) and/or a starting material for a (3D) object to be manufactured itself (within a build-up area for the manufacturing). Preferably, such a material separation device comprises at least one cooling section (which can be actively and/or passively cooled) to separate/deposition the condensate accordingly (e.g., by thermophoresis).

The (material) separation can preferably take place partly or completely inside and/or partly or completely outside a particulate material manufacturing device (or a corresponding process chamber).

A possible removal of the particulate material from the material separation device can be done, for example, mechanically (e.g., by scraping or scraping off) and/or removed by means of a separation fluid stream (e.g., in the form of compressed air or a blast of compressed air) (so that the condensate can be collected, for example, in a container located below). Such a separation or cleaning fluid can have (at least temporarily, possibly in the form of a pressure surge) a pressure of at least 2 bar, preferably at least 4 bar, and/or be applied cyclically. In this way, material can be separated in an effective manner.

It is also conceivable to transfer (guide) the particulate material to the subsequent process (e.g. to a process chamber of the subsequent process) via a transport device, for example a conduit, in particular so that the particulate material is further processed there, for example combined with another material. The subsequent process may be the same or a similar process from which the particulate material was also taken, or a different process. For example, it may in each case be additive manufacturing processes, in particular laser sintering or laser melting.

The starting material is preferably (at least substantially) particulate. Individual particles of the starting material preferably have a (mean) particle size (diameter) of at least 1 μm, preferably at least 5 μm and/or of at most 200 μm, preferably at most 100 μm. The (mean) particle size is preferably a d50 particle size. In the case of the average particle size, the indication D (numerical value) stands for the proportion of particles (in mass and/or volume percent) that are smaller than or equal to the indicated particle size (i.e., for a d50 of 50 μm, 50% of the particles have a size ≤50 μm).

The diameter of an individual particle may be a respective maximum diameter (=supremum of all distances per two points of the particle) or a sieve diameter or an equivalent sphere diameter (especially volume-related), if applicable.

The individual particles of the starting material can be (at least approximately) the same size, or there can be a particle size distribution. If a particle size distribution is present, for example, a d50 particle size may be at least 2 times, preferably at least 4 times, and/or at most 10 times, preferably at most 8 times, as large as a d10 particle size. Alternatively, or additionally, a d90 particle size may be at least 1.2 times, preferably at least 1.8 times and/or at most 4 times, preferably at most 3 times as large as a/the d50 particle size. Possibly, the particle sizes can be determined by laser diffraction methods (in particular by means of laser diffraction measurement according to ISO 13320 or ASTM B822). Alternatively, or additionally, the particle sizes can be determined by measuring (for example using a microscope) and/or with dynamic image analysis (preferably according to ISO 13322-2, possibly using the CAMSIZER® XT from Retsch Technology GmbH). If the particle size is determined from a 2-dimensional image (e.g. of a microscope, in particular an electron microscope), the respective diameter (maximum diameter or equivalent diameter) resulting from the 2-dimensional image is preferably used.

A diameter perpendicular to the maximum diameter (=supremum of all distances between two points of the particle whose connecting line is perpendicular to the maximum diameter) is preferably at least 0.1 times, further preferably at least 0.5 times, further preferably at least 0.7 times and/or at most 1.0 times, preferably at most 0.9 times as large as the maximum diameter (either in the 3-dimensional or, in particular when determining the respective diameters from an image, in the 2-dimensional with respect to the imaging plane).

Preferably, the starting material comprises at least partially, optionally predominantly in atomic %: at least one metal, preferably in particulate form, preferably at least one catalytically active metal (such as: Ni, Co, Fe, Rh, Ru, Pt, Pd and/or Zr) and/or at least one electrochemically active metal and/or at least one pyrophoric metal (such as: Mg, Ti, Ni, Co, Fe, Pb, at least one lanthanide and/or at least one actinide), particularly preferred Al, Fe, Ti, Ni, Co, Pt, Ag, Pd, Sc, Au, Zn, Zr, Mg, V, Si, Cu, Mn, W and/or Cr. Furthermore, there may be provided partially, possibly predominantly in atomic %: Mo, C and/or O. The respective element may preferably be present in at least 5 atom %, further preferably at least 20 atom %, optionally at least 50 atom % or even at least 90 atom %.

In step a), preferably a manufacturing device is used which is configured to manufacture an object by applying a build-up material comprising at least substantially metallic and/or ceramic components layer upon layer and selectively solidifying the build-up material, in particular by means of introducing radiation energy, at locations in each layer which are associated with the cross-section of the object in that layer. Particularly preferably, at least one laser is used here or a laser sintering process is carried out. In this way, material generated in a preceding process (within the above manufacturing device, in particular laser sintering) can be used in a particularly effective manner. Thus, a large amount of particulate material can be generated in a comparatively inexpensive manner. In or before step b), a condensate can be removed from a manufacturing chamber for manufacturing an object, in particular from at least one chamber inner wall, and/or from at least one material separation device, in particular filter device, preferably arranged at or behind an outlet of the manufacturing chamber.

The above-mentioned object is further solved by a system for providing a particulate material from a preferably at least substantially metallic and/or ceramic starting material, comprising:
- a generating device for generating the particulate material from the starting material by vaporizing the starting material by introducing energy, preferably radiation energy, in particular by means of at least one laser, into the starting material and subsequently at least partially condensing the vaporized starting material, as well as
- at least one receiving and/or transporting device, in particular at least one container, for receiving and/or transporting the particulate material, such that the particulate material can be used in a subsequent process, in particular in a state of at least non-permanent passivation.

The system may further comprise a collection device for collecting the particulate material, in particular at least one container.

The system may further comprise a storage device for storing the particulate material in the receiving means such that it is usable for a subsequent process, in particular in a state of at least non-permanent passivation.

The system may further comprise a device for making the particulate material available for a subsequent process.

The system may also be configured as a system for producing a composition, in particular for performing the method for producing a composition described below. For example, the system may comprise a device for combining (e.g., mixing) the particulate material with a further, in particular particulate, material, preferably an at least substantially metallic material and/or polymeric material, in particular comprising polyamide, and/or ceramic material. The polymer (material) may be selected from the group consisting of the following polymers, or comprise a polymer blend of at least two polymers selected from the group consisting of the following polymers:

Polyetherimides, polycarbonates, polyarylene sulfides, polyphenylene sulfones, polysulfones, polyphenylene oxides, polyether sulfones, acrylnitrile-butadiene-styrene copolymers, acrylnitrile-styrene-acrylate copolymers (ASA), polyvinyl chloride, polyacrylates, polyesters, polyamides, polyaryletherketones, polyethers, polyurethanes, polyimides, polyamide imides, polysiloxanes, polyolefins and copolymers which have at least two different repeating units of the aforementioned polymers, the group preferably consisting of polyaryletherketones, polyphenylene sulfides, polycarbonates, polyetherimides, polypropylene, polyethylene, and polyamides and copolymers and polymer blends thereof, more preferably the material comprising at least one polyaryletherketone, even more preferably the material comprising a polyetherketoneketone and/or polyetheretherketone-polyether diphenyletherketone (PEEK-PEDEK).

Further system features or device features result from the above and following description of the method according to the invention for providing the particulate material or for producing the composition.

The above-mentioned object is further solved by a particulate material provided by a method for providing particulate material of the above kind and/or by a system for providing particulate material of the above kind, wherein the particulate material preferably has a mean particle size of at least 1 nm, further preferably at least 3 nm, still further preferably at least 4 nm and/or at most 1,000 nm, preferably at most 100 nm, further preferably at most 50 nm. In this context, the particle size is preferably defined or can be determined as described further above in connection with the particle size of the particles of the starting material. The individual particles may be (at least substantially or at least approximately) equal in size, or a particle size distribution may be present. If a particle size distribution is present, a d10 particle size may be at least 0.1 times, preferably at least 0.2 times and/or at most 1.0 times, preferably at most 0.9 times as large as a d50 particle size. Alternatively, or additionally, a d90 particle size may be at least 1.0 times, preferably at least 1.2 times, further preferably at least 1.4 times and/or at most 10 times, preferably at most 5 times, further at most 4 times as large as a d50 particle size.

The particles of the particulate material are preferably at least approximately round. A diameter perpendicular to the maximum diameter (=supremum of all distances between two points of the particle whose connecting line is perpendicular to the maximum diameter) is preferably at least 0.1 times, further preferably at least 0.5 times, further preferably at least 0.7 times and/or at most 1.0 times, preferably at most 0.9 times as large as the maximum diameter (either in the 3-dimensional or, in particular when determining the respective diameters from an image, in the 2-dimensional with respect to the image plane).

Preferably, the particulate material has a specific surface area of at least 0.01 $m^2/g$, preferably at least 1 $m^2/g$, further preferably at least 5 $m^2/g$, still further preferably at least 10 $m^2/g$ and/or at most 1000 $m^2/g$, preferably at most 500 $m^2/g$, further preferably at most 200 $m^2/g$, still further preferably at most 50 $m^2/g$. The specific surface area can be determined (especially in the case of non-porous particles) by measuring at least 100, preferably at least 1,000 randomly selected particles (for example, particles on an image, in particular of a microscope, preferably an electron microscope, and which are recognizable and located next to each other), so that their surface and (knowing the material density) their weight can be calculated. If necessary, a BET measurement can also be carried out, preferably according to DIN ISO 9277 (valid in the Federal Republic of Germany at the time of application or priority date). A gas adsorption during the measurement (e.g. for $N_2$) can be dependent on the relative pressure $P/P_0$. The amount of adsorbed gas can be determined statically-volumetrically (isotherm). A sample quantity can be 100 mg. The "Quantachrome Nova® 4200e" analyser can be used for the measurement.

In general, the composition of the particulate material in atom % may correspond to the composition of the starting material (as described above). Preferably, the particulate material comprises at least partially, optionally predominantly in atom %: at least one metal, preferably in nanoparticle form, preferably at least one catalytically active metal (such as: Ni, Co, Fe, Rh, Ru, Pt, Pd and/or Zr) and/or at least one electrochemically active metal and/or at least one pyrophoric metal (such as: Mg, Ti, Ni, Co, Fe, Pb, at least one lanthanide and/or at least one actinide), particularly preferably Al, Fe, Ti, Ni, Co, Pt, Ag, Pd, Sc, Au, Zn, Zr, Mg, V, Si, Cu, Mn, W and/or Cr. In addition, Mo, O, and/or C, for example, may be present.

The above object is further solved by a method for producing a composition, wherein at least one particulate material produced with the above method or with the above system or a particulate material as described above and at least one further, in particular particulate, material, preferably an at least substantially metallic material and/or polymer material, in particular comprising polyamide, and/or ceramic material, is provided. Specifically, the further material may be metal powder, a polymer-based powder, and/or ceramic powder. Further, it may be a metal melt or polymer melt. The polymer may be selected from the group consisting of the following polymers, or may comprise a polymer blend of at least two polymers selected from the group consisting of the following polymers:

Polyetherimides, polycarbonates, polyarylene sulfides, polyphenylene sulfones, polysulfones, polyphenylene oxides, polyether sulfones, acrylnitrile-butadiene-styrene copolymers, acrylonitrile-styrene-acrylate copolymers (ASA), polyvinyl chloride, polyacrylates, polyesters, polyamides, polyaryletherketones, polyethers, polyurethanes, polyimides, polyamide imides, polysiloxanes, polyolefins and copolymers which have at least two different repeating units of the aforementioned polymers, the group preferably consisting of polyaryletherketones, polyphenylene sulfides, polycarbonates, polyetherimides, polypropylene, polyethylene, and polyamides and copolymers and polymer blends thereof, more preferably the material comprises at least one polyaryletherketone, even more preferably the material comprises a polyetherketone ketone and/or polyetheretherketone-polyether diphenyletherketone (PEEK-PEDEK).

A mixing of the particulate material into a melt can also be done (possibly with subsequent extrusion, e.g. for filament-based additive manufacturing processes). Particularly preferably, metal powders and/or polymer-based powders are employed.

The above-mentioned object is further solved by a composition, in particular prepared according to the above method for producing a composition, comprising at least one particulate material, prepared according to the above method for providing a particulate material or with the above system for providing a particulate material and/or a particulate material as described above and at least one further, in particular particulate, material, preferably an at least substantially metallic material and/or polymer material (in particular comprising polyamide, preferably PA12 or PA11) and/or a ceramic material. The further material preferably has a mean particle size (d50) of at least 1 μm, preferably at least 5 μm and/or of at most 200 μm, preferably at most 100 μm. The particle size may be specified, defined and/or distributed as described further above in connection with the starting material. A surface of the particles of the further material may be covered on average by at least 1%, preferably at least 10% and/or at most 100%, preferably at most 80% with the particulate material. The polymer(-material) may be selected from the group consisting of the following polymers, or may comprise a polymer blend of at least two polymers selected from the group consisting of the following polymers:

Polyetherimides, polycarbonates, polyarylene sulfides, polyphenylene sulfones, polysulfones, polyphenylene oxides, polyether sulfones, acrylonitrile-butadiene-styrene copolymers, acrylonitrile-styrene-acrylate copolymers (ASA), polyvinyl chloride, polyacrylates, polyesters, polyamides, polyaryletherketones, polyethers, polyurethanes, polyimides, polyamide imides, polysiloxanes, polyolefins and copolymers which have at least two different repeating units of the aforementioned polymers, the group preferably consisting of polyaryletherketones, polyphenylene sulfides, polycarbonates, polyetherimides, polypropylene, polyethylene and polyamides and their copolymers and polymer blends, more preferably the material comprising at least one polyaryletherketone, even more preferably the material comprising a polyetherketoneketone and/or polyetheretherketone-polyether diphenyletherketone (PEEK-PEDEK).

The above-mentioned object is further solved by a use of particulate material produced according to the above method for providing a particulate material and/or according to the above system for providing a particulate material and/or a particulate material as described above and/or a composition produced according to the above method for producing a composition and/or a composition as described above, in particular for (additively) building up an object, wherein the particulate material preferably comprises a proportion of at least 0.01% by weight, further preferably at least 0.05% by weight and/or at most 50% by weight, preferably at most 10% by weight, further preferably at most 5% by weight, further preferably at most 2% by weight based on the total weight of a (the) composition for building up the object. A 100% build-up is possible in principle. Preferably, the object is an object which is produced by applying a build-up material, which preferably comprises at least substantially metallic components and/or ceramics and/or polymer, layer upon layer and selectively solidifying the build-up material, in particular by means of the supply of radiation energy, at locations in each layer associated with the cross-section of the object in that layer. Particularly preferably, both the starting material can be obtained from a corresponding additive manufacturing process (in particular laser sintering) and the resulting particulate material can be used for such a process. In this way, manufacturing and further processing of the particulate material can be effectively realized.

Alternatively, or additionally, the particulate material can be employed in at least one electrochemical or electrotechnical application and/or electrochemical or electro-technical device, preferably as catalyst material of a catalyst, in particular a nickel catalyst, and/or be used as (electrode) material of a capacitor (supercapacitor). Instead of the use for a nickel catalyst, the use in an Fe or Co catalyst is also possible. Possibly used Fe or Co catalysts can be used, for example, in Fischer-Tropsch synthesis. Possibly selected Ni catalysts can be used, for example, for methanation. Further electro-technical and/or electrochemical applications are possible alternatively or additionally, such as in particular in a fuel cell, in a battery, in an accumulator, in a solar-technical device, in particular solar-thermal device and/or photovoltaic device, and/or in an electrolysis device.

The provided particulate material can be brought into plate form (for example be pressed), in particular be formed as catalyst plates, and/or (possibly in chemical reactors) be through-flowable (or be flowed through).

Capacitors (in particular so-called supercapacitors) often require metals with the highest possible specific surface area for a redox reaction. Particularly preferably, the particulate material according to the invention can be used for this purpose. Compared with activated carbon (as frequently used for supercapacitors), Fe condensate, for example, exhibits good electrical conductivity, high cycling stability, comparatively high gravimetric energy density and comparatively high specific capacitances.

Alternatively, or additionally, the particulate material can be used in coatings, in particular protective layers or protective films on any substrate, for example on a part of a building, in particular in/on a window and/or, in general, in/on glass and/or any other light-transmissive substrate. The layer may, for example, be electrically conductive and/or hydrophobic.

The composition of the particulate material may differ from the composition of the starting material. For example, elements with comparatively high (partial) vapour pressure and/or low melting temperature (e.g., Mg, Cu, and/or Mn) may be present in a relatively higher proportion in the particulate material than in the starting material. Conversely, this can apply to elements (e.g. Si, Mo, Ni and/or C) with comparatively low (partial) vapour pressure and/or high melting temperature. For example, in particular by weight, an oxygen content in the particulate material can be increased compared to the starting material (possibly by at least 1.2 times, or 2 times or 10 times). Also, a copper content (if present) may be increased in the particulate material. A nickel content, for example, may be decreased.

The particles of the particulate material may be present individually (detached from one another) or may be combined to form agglomerates comprising, for example, at least 10 or at least 100 or at least 1,000 or at least 100,000 particles. When such agglomerates are present, the respective particle size preferably refers to the primary particle size, i.e., the particle size of the particles of which the respective agglomerate is composed.

Further embodiments of the invention are apparent from the dependent claims.

In the following, the invention is described by means of exemplary embodiments which are explained in more detail with reference to the figures.

Figure 2:
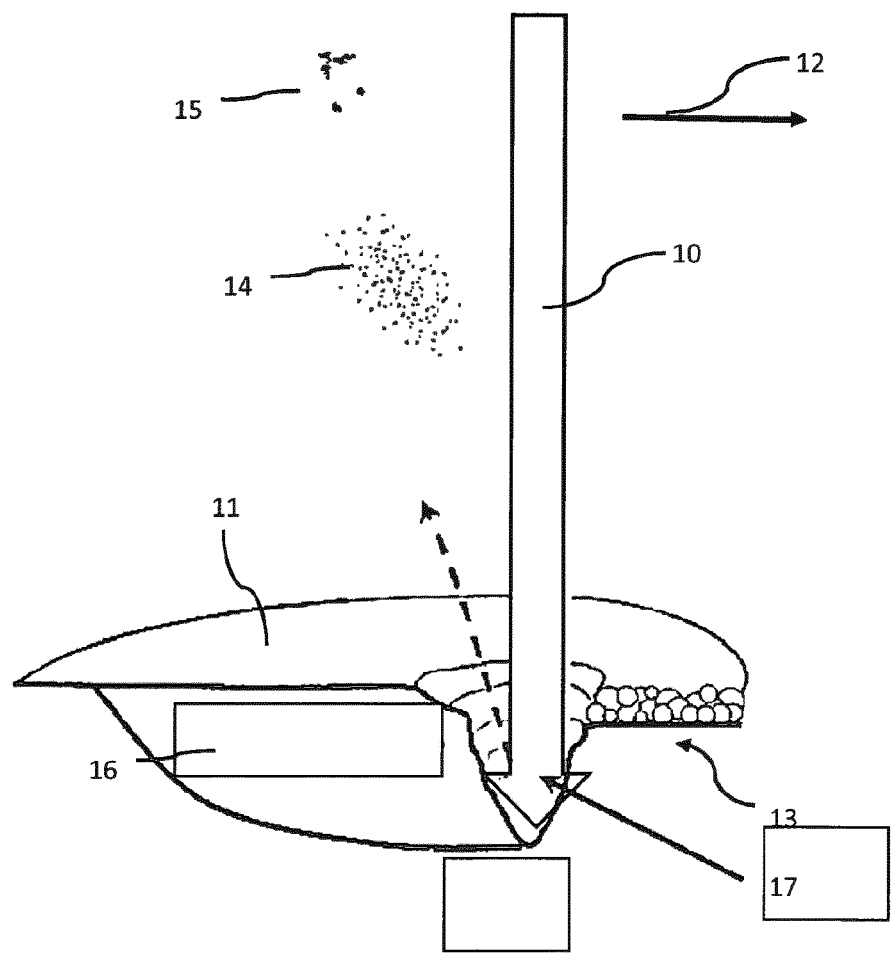
Figure 3:
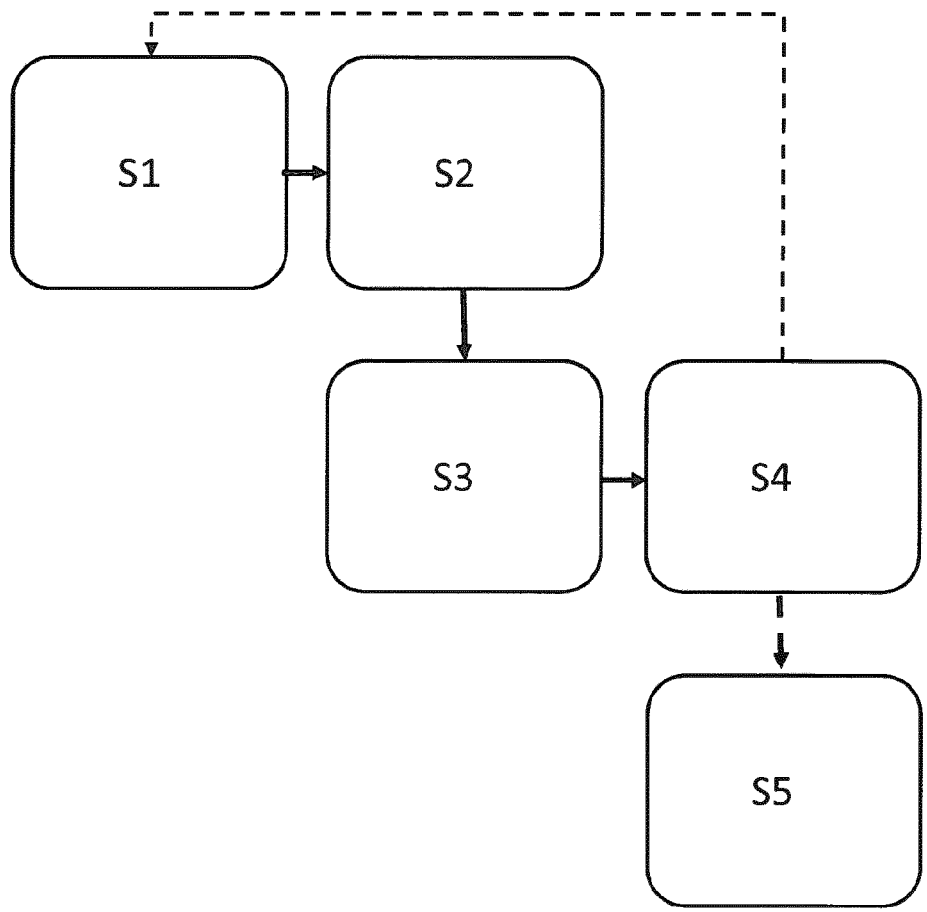
Figure 8:
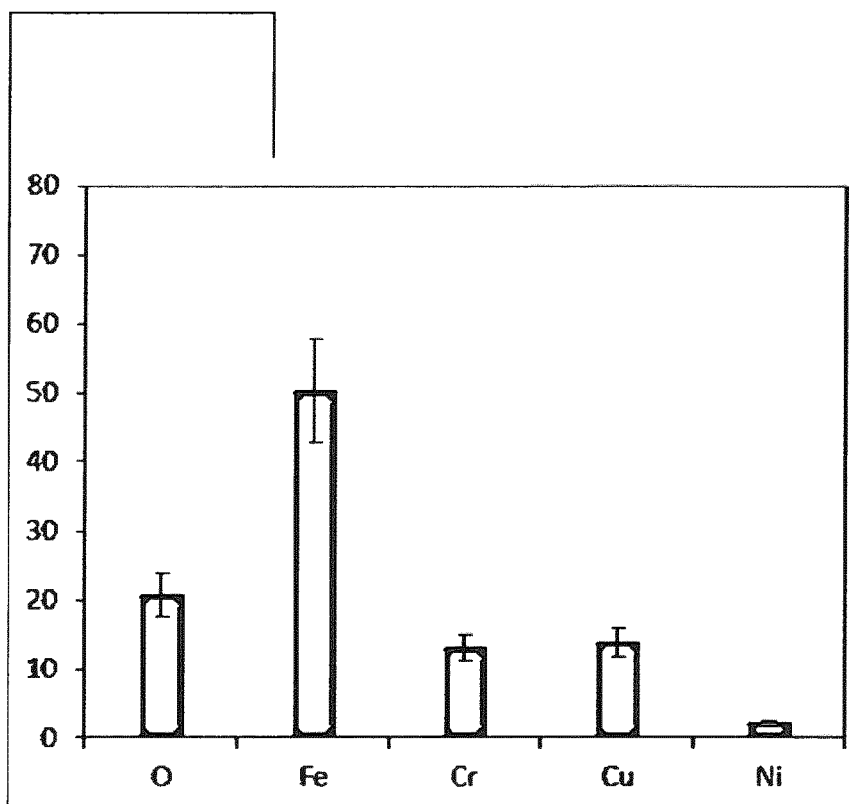
Figure 9:
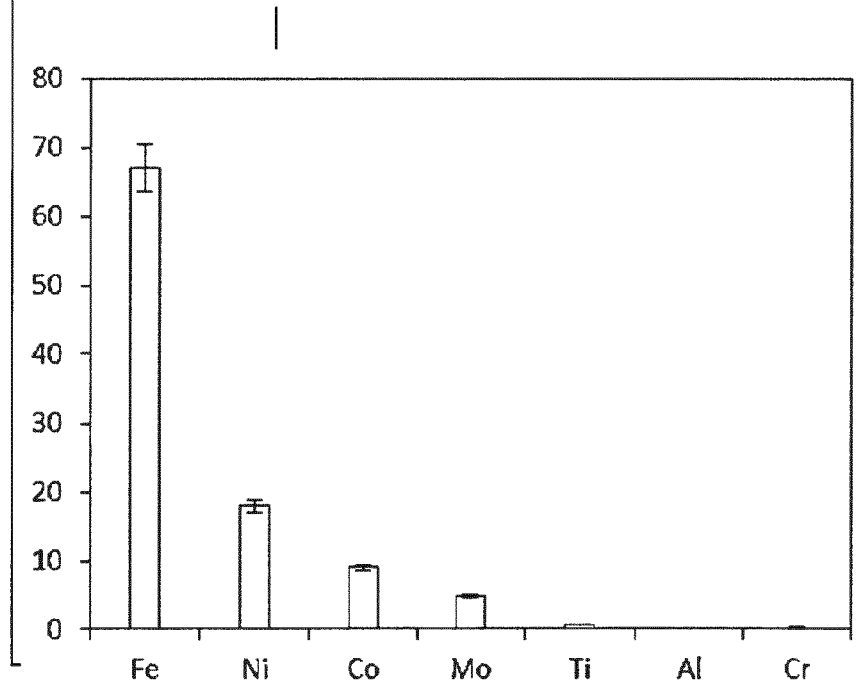

Hereby show:

FIG. 1 a schematic illustration, partially reproduced as a cross-section, of a device for the layer-by-layer construction of a 3-dimensional object;

FIG. 2 a schematic illustration of a formation of particles of the particulate material;

FIG. 3 a schematic illustration of a method according to the invention for providing a particulate material;

FIG. 4 a diagram of the chemical composition of a starting material according to the invention of a particulate material according to the invention;

FIG. 5 a diagram of the chemical composition of a further starting material according to the invention as well as a further particulate material according to the invention;

FIG. 6 a diagram of the chemical composition of a further starting material according to the invention as well as a further particulate material according to the invention;

FIG. 7 a diagram of the chemical composition of a further starting material according to the invention as well as a further particulate material according to the invention;

FIG. 8 a diagram of the chemical composition of a further particulate material according to the invention; and FIG. 9 a diagram of the chemical composition of a (build-up) powder.

The device shown in FIG. 1 is a laser sintering or laser melting device a1 known per se. For building-up an object a2 it contains a process chamber a3 with a chamber wall a4. In the process chamber a3, an upwardly open build-up container a5 with a wall a6 is arranged. A working plane a7 is defined by the upper opening of the build-up container a5, wherein the area of the working plane a7 lying within the opening, which can be used to build the object a2, is referred to as the build-up area a8. In the container a5 a support a10, which is movable in a vertical direction V, is arranged, to which a base plate a11 is attached, which closes off the build-up container a5 at the bottom and thus forms its base. The base plate a11 can be a plate formed separately from the support a10 and attached to the support a10, or it can be formed integrally with the support a10. Depending on the powder and process used, the base plate a11 may still have a building platform a12 on which the object a2 is built up. However, the object a2 can also be built up on the base plate a11 itself, which then serves as the building platform. In FIG. 1, the object a2 to be formed in the build-up container a5 on the building platform a12 is shown below the working plane a7 in an intermediate state with several solidified layers surrounded by build-up material a13 that has remained unsolidified. The laser sintering device a1 further includes a storage container a14 for a powdered build-up material a15 solidifiable by electromagnetic radiation, and a coater a16 movable in a horizontal direction H for applying the build-up material a15 to the build-up area a8. The laser sintering device a1 further includes an exposure device a20 having a laser a21 which generates a laser beam a22 as an energy beam which is deflected by a deflection device a23 and focused on the working plane a7 by a focusing device a24 via a coupling window a25 provided on the upper side of the process chamber a3 in the wall a4 thereof.

Further, the laser sintering device a1 includes a control unit a29 through which the individual components of the device a1 are controlled in a coordinated manner to perform the build-up process. The control unit a29 may include a CPU whose operation is controlled by a computer program (software). The computer program may be stored separately from the device on a storage medium from which it can be loaded into the device, in particular into the control unit. In operation, to apply a powder coating, the support a10 is first lowered by a height corresponding to the desired layer thickness.

By moving the coater a16 over the working plane a7 a layer of the powdered build-up material a15 is then applied. For safety, coater a16 pushes a slightly larger amount of build-up material a15 in front of it than is required to build up the layer. The coater a16 pushes the scheduled excess of build-up material a15 into an overflow container a18.

On each side of the build-up container a5 an overflow container a18 is arranged. The application of the powdered build-up material a15 takes place at least over the entire cross section of the object a2 to be produced, preferably over the entire build-up area a8, i.e., the area of the working plane a7 that can be lowered by a vertical movement of the support a10. Subsequently, the cross-section of the object a2 to be manufactured is scanned by the laser beam a22 with a radiation impact area (not shown), which schematically represents an intersection of the energy beam with the working plane a7. As a result, the powdered build-up material a15 is solidified at locations corresponding to the cross-section of the object a2 to be manufactured. These steps are repeated until the object a2 is completed and can be removed from the build-up container a5.

For generating a preferably laminar process gas flow a34 in the process chamber a3, the laser sintering device a1 further comprises a gas supply channel a32, a gas inlet nozzle a30, a gas outlet opening a31 and a gas discharge channel a33. The process gas flow a34 moves horizontally across the build-up area a8. The gas supply and discharge may also be controlled by the control unit a29 (not shown). The gas exhausted from the process chamber a3 may be fed to a filtering device (not shown), and the filtered gas may be fed back to the process chamber a3 via the gas supply channel a32, forming a recirculation system with a closed gas loop. Instead of only one gas inlet nozzle a30 and one gas outlet opening a31, several nozzles or openings can be provided in each case.

According to the invention, condensed-out particulate material can now be removed, for example, from the wall a4 or the (not shown) filter device and made available for a subsequent process, for example, a further process with a device according to FIG. 1.

FIG. 2 shows schematically how the particles of the particulate material are presumably created. Here, a laser beam 10 is moved over a surface 11. A corresponding direction of movement is symbolized by the arrow 12. The laser beam 10 melts starting material 13, whereby a part of the starting material is vaporized. The molten starting material is marked with the reference sign 16, the gaseous starting material with the reference sign 17. A so-called vapour capillary is formed at the point where the laser beam impinges. This contains vaporized material (e.g. metal) at high temperatures as a plasma. It is, due to buoyancy effects and material flowing up from below or subsequently vaporized material, ejected upwards from the vapour capillary (keyhole) at high velocities. By condensing, particulate material 14 is formed. This can still form agglomerates 15 in the further course of time. The (possibly agglomerated) particulate material can then be separated accordingly and made available for a subsequent process.

FIG. 3 illustrates a method for providing a particulate material. In a first step S1, the particulate material is generated from the starting material by vaporizing the starting material by introducing energy, preferably radiation energy, in particular by means of at least one laser, into the starting material and subsequently at least partially condensing the vaporized starting material. In a step S2, the particulate material is collected in at least one receiving and/or transporting device, in particular at least one container. In a step S3, the particulate material is stored in the (or a further) receiving device or transported in the transporting device such that it can be used for a subsequent process, in particular in a state of at least non-permanent passivation. In a step S4, the particulate material is provided for a subsequent process. Step S5 is then the subsequent process. This subsequent process may be an additive manufacturing process (in particular laser sintering) and/or a process for manufacturing a component, for example a supercapacitor or catalyst. In a specific embodiment, also after step S4, the particulate material may be used within a process in which step S1 is performed (e.g., laser sintering), which is symbolized by a dashed line.

FIG. 4 shows a diagram of a chemical composition (in % by weight) of a starting material (left bar of each group of three bars according to specification, middle bar of each group of three bars according to SEM/EDX measurements) and a starting material (right bar of each group of three bars). As can be seen, the oxygen content increases significantly, as does the Mg content. The Al content is reduced, the Si content even considerably. For the starting material (according to SEM/EDX measurements by means of Zeiss Supra® VP55), the following applies according to FIG. 1 generalized to corresponding ranges: 1-2% by weight O, 85-95% by weight Al, 8-12% by weight Si, 0.1-1% by weight Mg, or for the corresponding particulate material: 30-35% by weight O, 56-64% by weight Al, 1-3% by weight Si, 5-10% by weight Mg.

FIG. 5 shows another composition of a starting material, as follows (according to SEM/EDX measurements) generalized to corresponding ranges: 0-8% by weight O, 82-92% by weight Ti, 5-10% by weight Al, 3-6% by weight V, and for the corresponding particulate material (according to SEM/EDX measurements): 28-35% by weight O, 52-60% by weight Ti, 8-12% by weight Al, 2-5% by weight V, respectively.

FIG. 6 shows a third example of chemical compositions of the starting material as well as particulate material. The starting material may have (according to SEM/EDX measurement) a chemical composition as generalized to corresponding ranges as follows: 0.1-2% by weight O, 58-64% by weight Fe, 50-25% by weight Cr, 11-17% by weight Ni, 3-6% by weight Mo, 1-4% by weight Mn, 0.1-1% by weight Si. The corresponding particulate material may have the following composition (according to SEM/EDX measurement): 15-25% by weight O, 46-44% by weight Fe, 17-22% by weight Cr, 8-12% by weight Ni, 0.5-2% by weight Mo, 6-10% by weight Mn, 0.1-1% by weight Si.

FIG. 7 shows a fourth example of a chemical composition of starting material or particulate material. The starting material has (according to SEM/EDX measurements) the following composition generalized to corresponding ranges: 0.2% by weight O, 40-50% by weight Ni, 20-25% by weight Cr, 17-21% by weight Fe, 8-12% by weight Mo, 1-3% by weight Co. For the particulate material the following applies: 10-18% by weight O, 37-43% by weight Ni, 22-30% by weight Cr, 15-20% by weight Fe, 0-1% by weight Mo, 1-4% by weight Co.

In FIGS. 8 and 9 the chemical compositions of a particulate material or condensate (FIG. 8) and an associated (build-up) powder (FIG. 9) are shown.

The condensate according to FIG. 8 was produced by the metal sintering equipment M400-4 of the applicant. The condensate was collected in a receiving container and removed from there. Subsequently, the condensate according to FIG. 8 was (controlled) oxidized weighed and ground. In the same way the powder according to FIG. 9 was weighed. Condensate and powder were mixed (in a tumbling mixer for 10 min). Subsequently, it was sieved to a particle size <63 μm (sieve diameter).

Specifically, three mixing ratios were realized:

Mixture 1: 100% by weight of the powder according to FIG. 9.

Mixture 2: 99.15% by weight of the powder according to FIG. 9 and 0.85% by weight of the condensate according to FIG. 8

Mixture 3: 98.7% by weight of the powder according to FIG. 9 and 1.25% by weight of the condensate according to FIG. 8.

The following was found: The mixtures with condensate turned slightly brownish or reddish. The reason for this is the iron oxide content of the condensate according to FIG. 8.

In a subsequent laser sintering process (build-up process), the mixtures with condensate (powder) according to FIG. 8 could be coated well. No negative effects were observed.

However, it was found that a sieving is advantageous to remove larger condensate agglomerates. In this respect, it is considered preferable in a process step (before, during or after a combining, in particular mixing, of the particulate material or condensate with the further, in particular particulate, material or (original) powder) to carry out a separation process, in particular a sieving, in order to remove comparatively large agglomerates of the particulate material, in particular condensate. This is hereby also disclosed independently of the context of the embodiment example (for example, as a further development of one or more of the appended claims).

In the build-up process (sintering process) using the mixtures, no abnormalities were observed (apart possibly from a slightly different coloration of spatter).

Sintered components were slightly darker in mixture 3 (compared to mixture 1). Otherwise, no abnormalities were observed.

Overall, it can thus be stated that the condensates obtained via a laser sintering process can be used in a subsequent laser sintering process without (major) disadvantages (but with the advantages explained above of using such (nano-)particles or condensates).

Furthermore, it was found in tensile tests that by the addition of the condensate according to FIG. 8 the tensile strength of components produced in a laser sintering process can be increased. For the mixture 1 a tensile strength of (approximately) 1209 MPa was found, for the mixture 2 a tensile strength of (approximately) 1211 MPa and for the mixture 3 a tensile strength of (approximately) 1214 MPa.

It was also found that the yield strength was lowest for mixture 1 and highest for mixture 3.

Elongation at break and Young's modulus, in turn, were highest for mixture 1 and lowest for mixture 3. A possible explanation for this is that the oxides of the condensate embrittle the microstructure.

Furthermore, it was found that the porosity is lowest for mixture 1 and highest for mixture 3. Specifically, for mixture 1 a porosity of 0.034% could be determined, for mixture 2 of 0.058% and for mixture 3 of 0.070% (void volume).

At this point, it should be noted that all of the parts described above, taken alone and in any combination, in particular the details shown in the drawings, are claimed to be essential to the invention. Modifications thereof are familiar to those skilled in the art.

LIST OF REFERENCE SIGNS a1 laser sintering or laser melting device
a2 object
a3 process chamber
a4 chamber wall
a5 build-up container
a6 wall
a7 working plane
a8 build-up area
a10 movable support
a11 base plate
a12 building platform
a13 unsolidified build-up material
a14 storage container
a15 powdered build-up material/aluminium alloy
a16 movable coater
a20 exposure device
a21 laser
a22 laser beam
a23 deflection device
a24 focusing device
a25 coupling window
a29 control unit
a30 gas inlet nozzle
a31 gas outlet opening
a32 gas supply channel
a33 gas discharge channel
a34 laminar process gas flow
H horizontal direction
V vertical direction
10 laser beam
11 surface
12 arrow
13 starting material
14 particulate material
15 agglomerate
16 molten starting material
17 vaporized starting material

The invention claimed is:

1. A method of providing a particulate material from an at least substantially metallic or ceramic starting material, the method comprising:
generating the particulate material from the starting material by vaporizing the starting material by introducing energy by at least one laser into the starting material and subsequently at least partially condensing the vaporized starting material,
collecting the particulate material in at least one receiving or transporting container,
receiving or transporting the particulate material in the receiving or transporting container or in a further receiving or transporting device such that it can be used for a subsequent process in a state of at least non-permanent passivation, wherein the subsequent process is a manufacturing process in which the particular material is used, and
providing the particulate material for the subsequent process.

2. The method for providing a particulate material according to claim 1, wherein introducing energy includes vaporizing locally or in a grid-like manner, by at least one radiation source moving relative to an impact area and in a grid-like manner, or includes vaporizing by laser sintering.

3. The method for providing a particulate material according to claim 1, wherein generating the particulate matter includes introducing the energy into a moving starting material in which the starting material is moved in a transport gas.

4. The method of providing a particulate material according to claim 1, wherein the vaporized or condensed particulate material is passed to a material separation device, by which the particulate material is at least partially separated from a transport gas volume flow.

5. The method for providing a particulate material according to claim 1, wherein the starting material is substantially particulate, and wherein the particles of the starting material have a mean particle size of 1 μm to 100 μm.

6. The method for providing a particulate material according to claim 1, wherein the starting material comprises at least one metal, in particulate form, including
at least one catalytically active metal or
at least one electrochemically active metal or
at least one pyrophoric metal, or
Al, Fe, Ti, Ni, Co, Pt, Ag, Pd, Sc, Au, Zn, Zr, Mg, V, Si, Cu, Mn, W or Cr.

7. The method of providing a particulate material according to claim 1, wherein generating the particulate material includes using a manufacturing device configured to produce an object by applying a build-up material comprising at least substantially metallic or ceramic components layer upon layer and selectively solidifying the build-up material, by supplying radiation energy, at locations in each layer associated with a cross-section of the object in that layer.

\* \* \* \* \*